United States Patent [19]

Yamawaki et al.

[11] Patent Number: 5,665,660
[45] Date of Patent: Sep. 9, 1997

[54] GLASS COMPOSITION FOR BONDING A PHOSPHOR AND A FLUORESCENT LAMP

[75] Inventors: Hiroshi Yamawaki; Masahiko Yoshino, both of Odawara; Yasuo Oguri, Setagaya; Masayuki Yamane, Yokohama, all of Japan

[73] Assignee: Kasei Optnix, Ltd., Tokyo, Japan

[21] Appl. No.: 569,223

[22] PCT Filed: May 2, 1995

[86] PCT No.: PCT/JP95/00867

§ 371 Date: Jan. 2, 1996

§ 102(e) Date: Jan. 2, 1996

[87] PCT Pub. No.: WO95/31002

PCT Pub. Date: Nov. 16, 1995

[30] Foreign Application Priority Data

May 6, 1994 [JP] Japan .................. 6-094073
Jun. 30, 1994 [JP] Japan .................. 6-149494
Nov. 9, 1994 [JP] Japan .................. 6-274812
Apr. 27, 1995 [JP] Japan .................. 7-103530

[51] Int. Cl.$^6$ .................................................. H01J 61/46
[52] U.S. Cl. .................... 501/32; 313/493; 313/489; 313/485; 501/49; 501/50; 501/51; 501/52; 252/301.4 R
[58] Field of Search ................ 501/32, 49, 50, 501/51, 52; 313/493, 489, 485; 252/301.4 R

[56] References Cited

U.S. PATENT DOCUMENTS 4,540,915  9/1985  Shinkai et al. ................ 313/486
4,959,089  9/1990  Bhargava et al. ............... 501/49

FOREIGN PATENT DOCUMENTS 1011598  12/1965  United Kingdom ............. 501/49

*Primary Examiner*—Melissa Bonner
*Attorney, Agent, or Firm*—Wenderoth, Lind & Ponack

[57] ABSTRACT

The object of the present invention is to provide a glass composition which has a sufficient bonding strength for bonding a fluorescent film with a glass tube, does not hinder decomposition of the binder and is effective as an adhesive material, and to provide a fluorescent lamp using the glass composition. The object can be achieved by a glass composition, represented by the general formula, $$xMO \cdot yB_2O_3 \cdot zM'_2O_3 \cdot uM''O_2 \cdot vM'''_2O_5$$

in which M is at least one element of Mg, Ca, Sr, Ba and Zn, M' is at least one element of Al, Sc, Y and lanthanoid elements, M" is at least one element of Ti, Zr, Hf, Th and Si, M'" is at least one element of Nb and Ta, x, y, z, u and v satisfy the relationships of $0 < x \leq 70$, $15 \leq y \leq 80$, $0 \leq z \leq 50$, $0 \leq u \leq 30$, $0 \leq v \leq 30$, $0.5 \leq u+v \leq 50$ and $x+y+z+u+v=100$, represented by mol %, and by a fluorescent lamp, in which the glass composition is incorporated in a phosphor layer in a proportion of 0.1 to 10 weight %.

7 Claims, 1 Drawing Sheet

GLASS COMPOSITION FOR BONDING A PHOSPHOR AND A FLUORESCENT LAMP

TECHNICAL FIELD

This invention relates to a low melting point, less water-soluble glass composition for bonding a phosphor, which is suitable for bonding a fluorescent film to a glass tube in the production of a fluorescent lamp, and to a fluorescent lamp using the same.

BACKGROUND TECHNIQUE

Up to the present time, production of a fluorescent lamp has generally been carried out by dissolving nitrocellulose as a binder in an organic solvent such as butyl acetate, etc. to prepare a solution, in which a phosphor is then suspended, adding an adhesive material consisting of a divalent metal borate having a composition of $BaO.CaO.B_2O_3$ for the purpose of tenacious adhesion of the fluorescent film to the inner surface of a glass tube to the suspension, followed by adequately mixing, coating the resulting phosphor-coating liquid onto the inner surface of the glass tube, drying, baking to decompose and remove the binder and thus forming the fluorescent film.

Herein, the method of using such an organic coating composition has various problems of difficulty in handling, safety, poisonous character, economy, etc. and lately, has gradually been replaced by a method of using an aqueous phosphor-coating liquid. When using the above described adhesive material for the organic coating composition, i.e. $BaO.CaO.B_2O_3$ in an aqueous phosphor-coating liquid, however, there arises a problem that $BaO.CaO.B_2O_3$ tends to be dissolved in water as a solvent and its precipitate hinders the decomposition of the binder during baking, thus retaining carbon in the fluorescent film.

Thus, there have been proposed methods of using, as an adhesive material for an aqueous phosphor-coating liquid, aluminum oxide (Japanese Patent Publication No. 28668/1965), calcium pyrophosphate (Japanese Patent Publication No. 7440/1970), a low melting point glass (Japanese Patent Publication No. 1778/1991), etc.

When using aluminum oxide or calcium pyrophosphate as an adhesive material, however, there arises a problem that since a fluorescent film and a glass tube are bonded through van der Waals force, the bonding strength is weak and in particular, a circular fluorescent lamp obtained by bending the tube after forming the fluorescent film tends to often meet with peeling of the fluorescent film. In the case of using a low melting point glass as an adhesive material on the other hand, a fluorescent film is bonded to a glass tube by fusion and the bonding strength is sufficient, but the water resisting property is inferior.

Thus, it has been proposed to render a low melting point glass as an adhesive material less water-soluble by adding at least one of $Al_2O_3$, $SiO_2$ and $Sb_2O_3$ and an oxide of at least one of Y and lanthanoids (Ln) to a borate of at least one divalent metal selected from Mg, Ca, Sr, Ba and Zn (Japanese Patent Publication No. 1778/1991).

In this method, however, there arises a problem that the water resisting property is not sufficient and when the adhesive material is crushed in fine grains and suspended in water, the fine grains are dissolved in water. Accordingly, it has eagerly been desired to develop an adhesive material such that when a phosphor-coating liquid is coated onto a glass tube, the bonding strength of the fluorescent film with the glass tube is sufficently large and decomposition of the binder is not hindered.

The present invention aims at providing a glass composition for bonding a phosphor (which will hereinafter be referred to as "glass composition"), which has a sufficient bonding strength for bonding the fluorescent film with the glass tube, does not hinder decomposition of the binder and is effective as an adhesive material, and to a fluorescent lamp using the glass composition.

DISCLOSURE OF THE INVENTION

The above described problems can be solved by employing the following construction elements according to the present invention:

(1) A glass composition represented by the general formula,

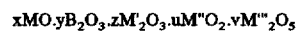

$$xMO.yB_2O_3.zM'_2O_3.uM''O_2.vM'''_2O_5$$

in which M is at least one element of Mg, Ca, Sr, Ba and Zn, M' is at least one element of Al, Sc, Y and lanthanoid elements, M" is at least one element of Ti, Zr, Hf, Th and Si, M'" is at least one element of Nb and Ta, x, y, z, u and v satisfy the relationships of $0<x\leq 70$, $15\leq y\leq 80$, $0\leq z\leq 50$, $0\leq u\leq 30$, $0\leq v\leq 30$, $0.5\leq u+v\leq 50$ and $x+y+z+u+v=100$, represented by mol %.

(2) The glass composition as described in above (1), wherein x, y, z, u and v satisfy the relationships of $5\leq x\leq 65$, $30\leq y\leq 70$, $0\leq z\leq 40$, $0\leq u\leq 30$, $0\leq v\leq 20$ and $1\leq u+v\leq 40$.

(3) A glass composition represented by the general formula,

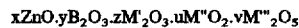

$$xZnO.yB_2O_3.zM'_2O_3.uM''O_2.vM'''_2O_5$$

in which M' is at least one element of Al and Sc, M" is at least one element of Ti, Zr, Hf, Th and Si, M'" is at least one element of Nb and Ta, x, y, z, u and v satisfy the relationships of $5\leq x\leq 70$, $25\leq y\leq 75$, $0\leq z\leq 40$, $0\leq u\leq 30$, $0\leq v\leq 30$ and $x+y+z+u+v=100$.

(4) The glass composition as described in above (3), wherein x, y, z, u and v satisfy the relationships of $10\leq x\leq 65$, $30\leq y\leq 65$, $0\leq z\leq 35$, $0\leq u\leq 25$ and $0\leq v\leq 20$.

(5) The glass composition as described in any one of above (1) to (4), wherein the softening point is in a temperature range of 600° to 700° C.

(6) The glass composition for bonding a phosphor as described in any one of above (1) to (5), wherein the water solubility is at most 200 µS/cm represented by electric conductivity.

(7) A fluorescent lamp, in which the glass composition described in any one of above (1) to (6) is incorporated in a phosphor layer on the inner surface of a glass tube in a proportion of 0.1 to 10 weight %.

By employing these constructions, there can be provided a low melting point glass having a good softening point and water resisting property as well as being excellent as an adhesive material of a phosphor, and a fluorescent lamp having a good fluorescent film without retaining carbon.

BEST EMBODIMENT FOR CARRYING OUT THE INVENTION

Figure 1:
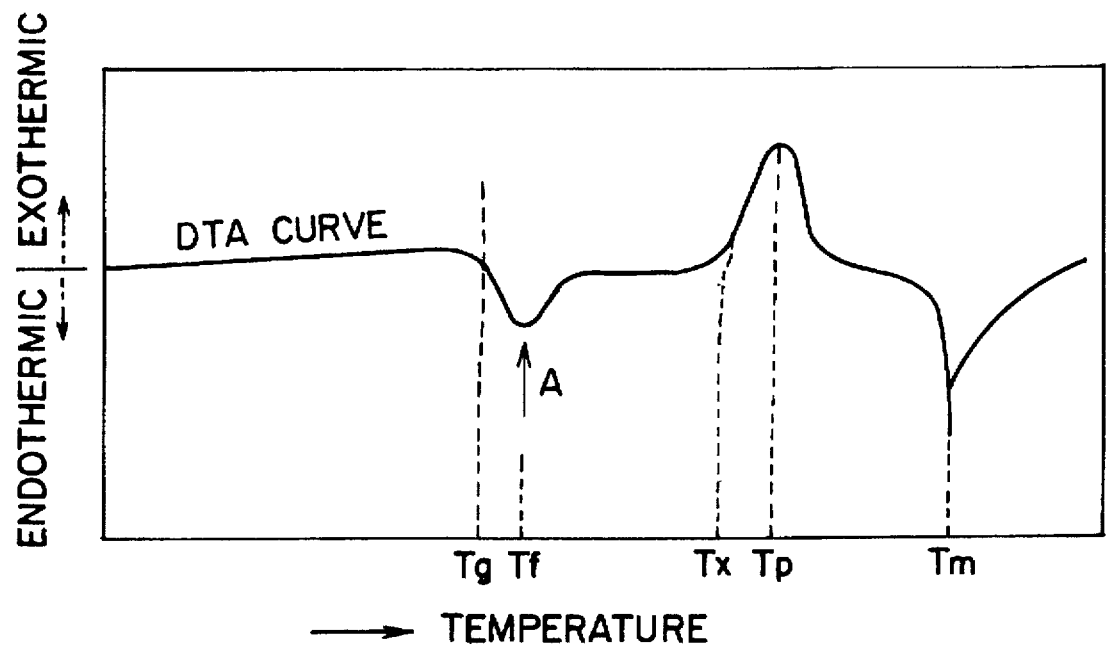
FIG. 1 shows a DTA curve of a glass composition obtained in Example 1 of the present invention.

The functions of the present invention will be illustrated by a preferred embodiment thereof.

Generally, the glass composition used as an adhesive material for forming a fluorescent film of a fluorescent lamp should be softened at a temperature range of 600° to 700° (as a first condition) between the baking temperature (500° to 600° C.) in the production of the fluorescent lamp and the cicuular fluorescent lamp bending temperature (700° to 800° C.), because if baking is conducted at 500° to 600° C. so as to remove the binder in the fluorescent film after coating the phosphor-coating liquid onto an inner wall of a glass tube, the glass composition as the adhesive material is softened and the binder in the fluorescent film is caught up, thus blackening the fluorescent film. In order to avoid this, it is necessary to adjust the softening point of the glass composition to higher than the baking temperature.

In the production of a circular fluorescent lamp, the tube bending operation is carried out at 700° to 800° C. If the glass composition is not softened at this operation temperature, the phosphor is not capable of maintaining the bonding with the glass tube and is thus peeled. Namely, the glass composition does not function as an adhesive material. Accordingly, it is necessary to adjust the softening point of the glass composition to lower than the tube bending operation temperature.

Furthermore, it is required that the glass composition used as an adhesive material is insoluble in solvents (the solvent being water in the case of aqueous phosphor-coating liquid) (as a second condition). The reason therefor is that if the glass composition is dissoved in water, the once dissolved material is again precipitated during drying the fluorescent film and surrounds an organic binder, so that decomposition of the organic binder is hindered during baking to retain carbon.

Thus, the inventors have prepared by way of trial a number of glass compositions while changing combinations of various metal oxides as glass constituting components and compounding ratios thereof, followed by subjecting them to analysis, and consequently, have found a low melting point glass composition having a good softening point and water resisting property as well as characteristics suitable for use as an adhesive material of a fluorescent film for a fluorescent lamp.

The glass composition of the present invention has a composition represented by the general formula,

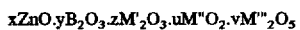

in which M is at least one element of Mg, Ca, Sr, Ba and Zn, M' is at least one element of Al, Sc, Y and lanthanoid elements, M" is at least one element of Ti, Zr, Hf, Th and Si, M'" is at least one element of Nb and Ta, x, y, z, u and v satisfy the relationships of $0<x\leq70$, $15\leq y\leq80$, $0\leq z\leq50$, $0\leq u\leq30$, $0\leq v\leq30$, $0.5\leq u+v\leq50$ and $x+y+z+u+v=100$, represented by mol %.

In the above described general formula, if the values of x, y, z, u and v are outside the above described range, the water resisting property and softening point of the resulting composition cannot maintain the characteristics suitable for the fluorescent film of a fluorescent lamp, while if x, y, z, u and v satisfy the above described ranges, the water resisting property and softening point desirable for an adhesive material can be maintained and if x, y, z, u and v satisfy the relationships of $5\leq x\leq65$, $30\leq y\leq70$, $0\leq z'40$, $0\leq u\leq30$, $0\leq v\leq20$ and $1\leq u+v\leq40$, more preferable properties as an adhesive material can be attained.

The other glass composition of the present invention has a composition represented by the general formula,

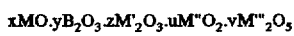

in which M' is at least one element of Al and Sc, M" is at least one element of Ti, Zr, Hf, Th and Si, M'" is at least one element of Nb and Ta, x, y, z, u and v satisfy the relationships of $5\leq x\leq70$, $25\leq y\leq75$, $0\leq z\leq40$, $0\leq u\leq30$, $0\leq v\leq30$ and $x+y+z+u+v=100$.

In the above described general formula, if the values of x, y, z, u and v satisfy the above described ranges, the water resisting property and softening point suitable for an adhesive material of a fluorescent film for a fluorescent lamp can be maintained and if x, y, z, u and v satisfy the relationships of $10\leq x\leq65$, $30\leq y\leq65$, $0\leq z\leq35$, $0\leq u\leq25$ and $0\leq v\leq20$, more preferable properties as an adhesive material can be attained.

The glass composition of the present invention preferably has a softening point in a temperature range of 600° to 700° C. and a water solubility of at most 200 μS/cm represented by electric conductivity.

The fluorescent lamp of the present invention is obtained by coating a phosphor-coating liquid containing 0.1 to 10 weight %, preferably 0.5 to 5.0 weight % of the above described glass composition onto a wall of a glass tube.

In the glass composition of the present invention, the network former (NWF) is $B_2O_3$, but when using only this component, the water resisting property and softening point are too low to be put to practical use. Accordingly, an oxide of another element is required as the network modifier (NWM).

In the glass composition of the present invention, as the network modifier, there is used a predetermined quantity of divalent metal oxide representd by MO (M is at least one of Mg, Ca, Sr, Ba and Zn). When this divalent metal oxide is added, the glass-forming ability is improved and crystallization of the glass hardly occurs, but in the case of using another divalent metal oxide than that of Zn, the water resisting property is low.

Thus, a predetermined quantity of trivalent metal oxide represented by $M'_2O_3$ (M' is at least one element of Al, Sc, Y and lanthanoid elements) is further used as an oxide of the other element. The addition of the trivalent metal oxide represented by $M'_2O_3$ results in advantages of improving the glass-forming ability as well as largely improving the water resisting property.

Furthermore, in the glass composition of the present invention, the water resisting property is more improved by adding a predetermined quantity of tetra-valent metal oxide represented by $M"O_2$ (M" is at least one element of Ti, Zr, Hf, Th and Si) and a predetermined quantity of penta-valent metal oxide represented by $M'"_2O_5$ (M'" is at least one element of Nb and Ta).

When the divalent metal oxide consists of only ZnO, the water resisting property is more excellent than when using other divalent metal oxides, but in this case, the water resisting property is also more improved by adding, as the network modifier (NWM), predetermined quantities of the above described trivalent metal oxide represented by $M'_2O_3$, tetra-valent metal oxide represented by $M"O_2$ and/or penta-valent metal oxide represented by $M'"_2O_5$.

Production of the glass composition of the present invention is generally carried out by weighing raw materials comprising oxides represented by MO such as ZnO, $B_2O_3$, $M'_2O_3$, $M"O_2$ and $M'"_2O_5$ or compounds of M, B, M', M" and M'" capable of being converted into these oxides at high temperatures, for example, carbonates, oxalates, hydroxides, etc. of these elements in amounts of stoichiometrically forming $xMO \cdot yB_2O_3 \cdot zM'_2O_3 \cdot uM''O_2 \cdot vM'''_2O_5$ or $XZnO \cdot yB_2O_3 \cdot zM'_2O_3 \cdot uM''O_2 \cdot vM'''_2O_5$, adequately mixing the raw materials, charging the mixture in a heat resistant vessel such as a platinum crucible, heating and fusing it in a high temperature furnace at a temperature of 1000° to 1500° C. for 1 to 2 hours, withdrawing the product out of the furnace, rapidly cooling it, crushing the product by a mortar in fine powder and sieving it in a predetermined grain diameter range to obtain a glass powder.

In addition, the fluorescent lamp of the present invention can be produced by dispersing a desired phosphor in an aqueous solution binder of polyethylene oxide, to which a predetermined quantity of the above described glass composition is added, converting the resulting mixture into a slurry to prepare a phosphor-coating liquid, coating this coating liquid onto a glass tube of the fluorescent lamp and then subjecting to a well known processing.

The quantity of the glass composition of the present invention to be added to a phosphor-coating liquid is 0.1 to 10 weight %, preferably 0.5 to 5.0 weight % based on the phosphor, since if the quanity is less than 0.1 weight %, the bonding strength of a fluorescent film is not sufficient, while if more than 10 weight %, the emission luminance of the resulting fluorescent lamp is lowered.

Whether the glass composition is good or bad as an adhesive material is judged by the carbon-retained state in a fluorescent film after a baking step, the presence or absence of peeling of the fluorescent film from a glass tube wall during a step of producing a fluorescent lamp and the finished state of the fluorescent film after coating the phosphor-coating liquid.

The carbon-retained state in a fluorescent film is judged by the whiteness of the body color of a glass tube after baking the fluorescent film formed on the inner wall of the glass tube. The less the retained quantity of carbon, the more white the body color of the glass tube, on which the fluorescent film is formed, and the higher the reflectance of the glass tube. A fluorescent lamp using the glass composition of the present invention as an adhesive material exhibits a higher reflectance.

When the bonding strength of a fluorescent film is insufficient, peeling of the fluorescent film occurs at the end of the tube in a step of evacuating the tube after forming the fluorescent film on the inner wall of the glass tube, that is, when the tube is evacuated or when thereafter, Ar gas is rapidly introduced into the tube.

When a predetermined quantity of the glass composition of the present invention is used as an adhesive material, the fluorescent film is not peeled, nor are abnormal changes found.

EXAMPLE

Measurement of Softening Point

Measurement of the softening point of the glass composition is carried out by subjecting a sample obtained by crushing in at most 20 µm by a mortar and sieving to DTA measurement (differential thermal analysis) at a temperature raising rate of 10° C./min using an alumina sample as a reference sample and reading the temperature at Point A in the resulting curve (Cf. FIG. 1) as a softening point. Thus, such a judgment is made that a sample having a softening point of 600° to 700° C. is a preferable glass composition as an adhesive material of a fluorescent film for a circular fluorescent lamp.

Measurement of Water Solubility

For the measurement of the solubility in water of the glass composition, the glass composition is subjected to an elution treatment according to the test method of a glass instrument for chemical analysis, stipulated in JIS R 8502. Firstly, a sample is crushed and sieved in 250 to 420 µm, washed with ethanol to remove a finer powder, dried, after which a specific gravity gram portion (same gram number as numeral of specific gravity) is weighed, charged in a pot of 250 ml in voloume with 100 g of deionized water and subjected to rolling at a revolution number of 100 rpm for 20 hours, and the electric conductivity of this elution-treated solution is measured to obtain a value which is used as a standard of water-solubility. The lower the value of the electric conductivity, the better the water resisting property. And when this value is substantially at most 200 µS/cm, the water resisting property is better than that of the glass compositions for bonding phosphors of the prior art, and when this value is at most 150 µS/cm, the water resisting property is further better. In the present invention, therefore, it is judged that when the electric conductivity of the elution-treated solution of the glass composition, obtained in the above described manner, is at most 200 µS/cm, the water resisting property on practical use as a phosphor adhesive material can be maintained.

Example 1

CaO, $B_2O_3$, $Al_2O_3$ and $Ta_2O_5$ shown as raw materials in Table 1 were adequately mixed in a proportion of 20:60:15:5 by mole, charged in a platinum crucible, heated and melted in an electric furnace at 1400° C. for 120 minutes, quenched and crushed in a mortar, thus obtaining a glass composition of Example 1.

The softening point and water-solubility of the glass composition in Example 1 were measured to obtain results shown in Table 1. The softening point was 670° C. and the water-solubility was 40 µS/cm, both satisfying the requisite as the adhesive material for forming a fluorescent film of a fluorescent lamp.

Comparative Example 1

For comparison, a glass composition of Comparative Example 1 was prepared in an analogous manner to the glass composition of Example 1 except mixing CaO, $B_2O_3$ and $Al_2O_3$ shown as raw materials in Table 2 in a proportion of 25:50:25 by mole.

When the softening point and water-solubility of the glass composition in Comparative Example 1 were measured by the above described method, the softening point was 665° C. as shown in Table 2, which was in the scope of the target softening point of 600° to 700° C., but the water-solubility was 423 µS/cm, which was larger than the aimed level, 200 µS/cm. Namely, the water resisting property was not sufficient.

Examples 2 to 39 and Comparative Examples 2 to 15

Glass compositions of Examples 2 to 39 and Comparative Examples 2 to 15 were prepared in an analogous manner to the glass compositions of Example 1 and Comparative Example 1, except mixing the raw materials in proportions shown in Tables 1 and 2 by mole and the softening points and water-solubilities of these glass compositions were measured by the above described method, thus obtaining results shown in Tables 1 and 2.

TABLE 1

| Example | xMO M | x | yB$_2$O$_3$ B$_2$O$_3$ | y | zM'$_2$O$_3$ M' | z | uM"O$_2$ M" | u | vM'''$_2$O$_5$ M''' | v | Softening Point (°C.) | Water Solubility (μS/cm) |
|---|---|---|---|---|---|---|---|---|---|---|---|---|
| 1 | Ca | 20 | B$_2$O$_3$ | 60 | Al | 15 | — | — | Ta | 5 | 670 | 40 |
| 2 | Zn | 55 | B$_2$O$_3$ | 40 | — | — | Zr | 5 | — | — | 603 | 6 |
| 3 | Ca | 25 | B$_2$O$_3$ | 50 | Al | 24.5 | — | — | Ta | 0.5 | 666 | 198 |
| 4 | Ca | 25 | B$_2$O$_3$ | 50 | Al | 24 | — | — | Ta | 1 | 666 | 184 |
| 5 | Ca | 25 | B$_2$O$_3$ | 50 | Al | 22 | — | — | Ta | 3 | 668 | 163 |
| 6 | Ca | 25 | B$_2$O$_3$ | 50 | Al | 15 | — | — | Ta | 10 | 683 | 14 |
| 7 | Ca | 25 | B$_2$O$_3$ | 50 | Al | 5 | — | — | Ta | 20 | 694 | 7 |
| 8 | Ca | 25 | B$_2$O$_3$ | 50 | Al | 20 | — | — | Nb | 5 | 648 | 80 |
| 9 | Ca | 25 | B$_2$O$_3$ | 50 | Sc | 20 | — | — | Ta | 5 | 675 | 158 |
| 10 | Ca | 15 | B$_2$O$_3$ | 70 | Y | 10 | — | — | Ta | 5 | 680 | 183 |
| 11 | Ca | 15 | B$_2$O$_3$ | 70 | Eu | 10 | — | — | Ta | 5 | 674 | 176 |
| 12 | Mg | 25 | B$_2$O$_3$ | 50 | Al | 20 | — | — | Ta | 5 | 692 | 25 |
| 13 | Ca | 25 | B$_2$O$_3$ | 50 | Al | 20 | — | — | Ta | 5 | 672 | 72 |
| 14 | Sr | 25 | B$_2$O$_3$ | 50 | Al | 20 | — | — | Ta | 5 | 634 | 98 |
| 15 | Ba | 25 | B$_2$O$_3$ | 50 | Al | 20 | — | — | Ta | 5 | 614 | 142 |
| 16 | Ca | 25 | B$_2$O$_3$ | 50 | Al | 15 | Ti | 5 | Nb | 5 | 665 | 42 |
| 17 | Ca | 25 | B$_2$O$_3$ | 50 | Al | 15 | Zr | 5 | Nb | 5 | 672 | 35 |
| 18 | Ca | 25 | B$_2$O$_3$ | 50 | Al | 15 | Th | 5 | Nb | 5 | 665 | 19 |
| 19 | Zn | 40 | B$_2$O$_3$ | 50 | Al | 10 | — | — | — | — | 646 | 11 |
| 20 | Zn | 20 | B$_2$O$_3$ | 50 | Al | 30 | — | — | — | — | 685 | 35 |
| 21 | Zn | 60 | B$_2$O$_3$ | 30 | — | — | Si | 10 | — | — | 651 | 58 |
| 22 | Zn | 30 | B$_2$O$_3$ | 50 | — | — | Th | 20 | — | — | 696 | 12 |
| 23 | Zn | 40 | B$_2$O$_3$ | 50 | Sc | 5 | Ti | 5 | — | — | 657 | 33 |
| 24 | Zn | 40 | B$_2$O$_3$ | 50 | Al | 5 | Hf | 5 | — | — | 660 | 42 |
| 25 | Zn | 30 | B$_2$O$_3$ | 60 | — | — | — | — | Ta | 10 | 676 | 8 |
| 26 | Zn | 20 | B$_2$O$_3$ | 65 | — | — | — | — | Nb | 15 | 694 | 15 |
| 27 | Zn | 50 | B$_2$O$_3$ | 50 | — | — | — | — | — | — | 626 | 89 |
| 28 | Zn | 25 | B$_2$O$_3$ | 50 | Al | 20 | — | — | Ta | 5 | 680 | 8 |
| 29 | Ca | 25 | B$_2$O$_3$ | 50 | Sc | 15 | Ti | 5 | Nb | 5 | 665 | 42 |
| 30 | Ca | 25 | B$_2$O$_3$ | 50 | Sc | 15 | Zr | 5 | Nb | 5 | 665 | 35 |
| 31 | Ca | 25 | B$_2$O$_3$ | 50 | Sc | 15 | Th | 5 | Nb | 5 | 665 | 19 |
| 32 | Zn | 48 | B$_2$O$_3$ | 40 | Al | 12 | — | — | — | — | 611 | 6 |
| 33 | Zn | 32 | B$_2$O$_3$ | 60 | Al | 8 | — | — | — | — | 652 | 9 |
| 34 | Zn | 30 | B$_2$O$_3$ | 40 | Al | 30 | — | — | — | — | 667 | 12 |
| 35 | Zn | 25 | B$_2$O$_3$ | 50 | Al | 25 | — | — | — | — | 670 | 16 |
| 36 | Zn | 20 | B$_2$O$_3$ | 60 | Al | 20 | — | — | — | — | 675 | 25 |
| 37 | Zn | 60 | B$_2$O$_3$ | 40 | — | — | — | — | — | — | 605 | 45 |
| 38 | Zn | 58 | B$_2$O$_3$ | 37 | Al | 5 | — | — | — | — | 615 | 22 |
| 39 | Zn | 5 | B$_2$O$_3$ | 68 | Al | 27 | — | — | — | — | 682 | 128 |

TABLE 2

| Comparative Example | xMO M | x | yB$_2$O$_3$ B$_2$O$_3$ | y | zM'$_2$O$_3$ M' | z | uM"O$_2$ M" | u | vM'''$_2$O$_5$ M''' | v | Softening Point (°C.) | Water Solubility (μS/cm) |
|---|---|---|---|---|---|---|---|---|---|---|---|---|
| 1 | Ca | 25 | B$_2$O$_3$ | 50 | Al | 25 | — | — | — | — | 665 | 423 |
| 2 | Mg | 40 | B$_2$O$_3$ | 50 | Al | 10 | — | — | — | — | 700 | 413 |
| 3 | Ca | 40 | B$_2$O$_3$ | 50 | Al | 10 | — | — | — | — | 672 | 685 |
| 4 | Ba | 40 | B$_2$O$_3$ | 50 | Al | 10 | — | — | — | — | 618 | 1050 |
| 5 | Ca | 40 | B$_2$O$_3$ | 50 | Al | 10 | — | — | — | — | 700 | 800 |
| 6 | Ca | 30 | B$_2$O$_3$ | 50 | Al | 20 | — | — | — | — | 670 | 600 |
| 7 | Ca | 20 | B$_2$O$_3$ | 50 | Al | 30 | — | — | — | — | 670 | 520 |
| 8 | Ca | 25 | B$_2$O$_3$ | 50 | Al / La | 24.5 / 0.5 | — | — | — | — | 658 | 275 |
| 9 | Ca | 25 | B$_2$O$_3$ | 50 | Al / La | 24 / 1 | — | — | — | — | 655 | 253 |
| 10 | Ca | 25 | B$_2$O$_3$ | 50 | Al / La | 22 / 3 | — | — | — | — | 652 | 212 |
| 11 | Zn | 16 | B$_2$O$_3$ | 80 | Al | 4 | — | — | — | — | Devitrification | |
| 12 | Zn | 64 | B$_2$O$_3$ | 20 | Al | 16 | — | — | — | — | Devitrification | |
| 13 | Zn | 15 | B$_2$O$_3$ | 40 | Al | 45 | — | — | — | — | Devitrification | |
| 14 | Zn | 75 | B$_2$O$_3$ | 25 | Al | 0 | — | — | — | — | Devitrification | |
| 15 | Zn | 3 | B$_2$O$_3$ | 75 | Al | 22 | — | — | — | — | Devitrification | |

DISCUSSION

It is evident from Examples 3 to 7 that when the quantity of $Al_2O_3$ is decreased and that of $Ta_2O_5$ is increased, there is provided an effect that the water-solubility of the resulting glass composition is decreased.

As apparent from comparison of Examples 8 and 9, there is obtained a glass composition having a lower water-solubility in the case of using $Al_2O_3$ as $M'_2O_3$ rather than $Sc_2O_3$.

As apparent Examples 16 to 18, there are obtained a glass composition having a lower water-solubility in the case of using $ZrO_2$ as a tetra-valent metal oxide ($M"O_2$) than $TiO_2$ and a glass composition having the lowest water-solubility, i.e. best water resisting property in the case of using $ThO_2$.

As apparent from comparison of Example 19 and Comparative Examples 2 to 4, the water-solubility of a glass composition in the case of using ZnO as a divalent metal oxide (MO) is much smaller than in the case of using other divalent metal oxides than ZnO, teaching that the water resisting property is markedly improved in the former case.

As apparent from Examples 19 to 20, in the case of using ZnO as a divalent metal oxide (MO), there is a tendency such that the water solubility of the resulting glass composition is increased and the water-resisting property is lowered with decrease of the content of ZnO.

In these Examples, the glass compositions obtained using, as MO, ZnO in a quantity of 20 to 60 mol % are particularly excellent in water resisting property.

Examples 40 to 78

A phosphor was suspended in water with polyethylene oxide (binder) and 3 weight % based on the phosphor of each of the glass compositions (adhesive material) of Examples 1 to 39, adequately crushed, and adequately mixed to prepare a phosphor-coating liquid. This phosphor-coating liquid was applied to a glass tube, subjected to baking at 500° C. for 8 minutes and a linear fluorescent lamp of 40 W was prepared in an ordinary manner. The resulting fluorescent lamps all showed a white body color and even when Ar was rapidly introduced from vacuum in an evacuating step, there was found no peeling of the fluorescent film at the tube end.

Comparative Examples 16 to 30

When Example 40 was repeated except using each of the glass compositions of Comparative Examples 1 to 15 as an adhesive material to prepare a fluorescent lamp, the resulting fluorescent lamps each showed a blackish body color and lowered emission efficiency.

Example 79

When Example 40 was repeated except using 0.5 weight %, 1 weight %, 2 weight %, 5 weight % and 8 weight % of the glass composition powder of Example 2 as an adhesive material to prepare a fluorescent lamp, the resulting fluorescent lamps each showed white body color and even when Ar was rapidly introduced from vacuum in an evacuating step, there was found no peeling of the fluorescent film at the tube end.

Comparative Example 31

When Example 40 was repeated except using 0.02 weight % of the glass composition powder of Example 2 as an adhesive material to prepare a fluorescent lamp, the resulting fluorescent lamp showed peeling of the fluorescent film when Ar was rapidly introduced from vacuum in an evacuating step.

Comparative Example 32

When Example 40 was repeated except using 15 weight % of the glass composition powder of Example 2 as an adhesive material to prepare a fluorescent lamp, the resulting fluorescent lamp showed no peeling of the fluorescent film even when Ar was rapidly introduced from vacuum in an evacuating step, but the packed state of the phosphor grains coated onto the tube wall was so bad that there was obtained a surface-roughened coating film and the emission efficiency was lowered.

UTILITY AND POSSIBILITY ON COMMERCIAL SCALE

According to the construction element of the present invention, there can be provided a low melting point glass, which has a good softening point as well as high water resisting property and which is excellent as an adhesive material and in particular, suitable for bonding a glass tube and a fluorescent film, in the production of a fluorescent lamp.

We claim:

1. A fluorescent lamp, in which a glass composition for bonding a phosphor, represented by the general formula, $$xMO \cdot yB_2O_3 \cdot zM'_2O_3 \cdot uM"O_2 \cdot vM'''_2O_5$$

wherein M is at least one element selected from the group consisting of Mg, Ca, Sr, Ba and Zn, M' is at least one element selected from the group consisting of Al, Sc, Y and lanthanoid elements, M" is at least one element selected from the group consisting of Ti, Zr, Hf, Th and Si, M''' is a least one element selected from the group consisting of Nb and Ta, x, y, z, u and v satisfy the relationships of $0 < x \leq 70$, $15 \leq y \leq 80$, $0 \leq z \leq 50$, $0 \leq u \leq 30$, $0 \leq v \leq 30$, $0.5 \leq u+v \leq 50$ and $x+y+z+u+v=100$, represented by mol %, is incorporated in a phosphor layer on the inner surface of a glass tube.

2. The fluorescent lamp as claimed in claim 1, wherein x, y, z, u and v satisfy the relationships of $5 \leq x \leq 65$, $30 \leq y \leq 70$, $0 \leq z \leq 40$, $0 \leq u \leq 30$, $0 \leq v \leq 20$ and $1 \leq u+v \leq 40$, represented by mol %.

3. A fluorescent lamp, in which a glass composition for bonding a phosphor, represented by the general formula, $$xZnO \cdot yB_2O_3 \cdot zM'_2O_3 \cdot vM"O_2 \cdot vM'''_2O_5$$

wherein M' is at least one element selected from the group consisting of Al and Sc, M" is at least one element selected from the group consisting of Ti, Zr, Hf, Th and Si, M''' is at least one element selected from the group consisting of Nb and Ta, x, y, z, u and v satisfy the relationships of $5 \leq x \leq 70$, $25 \leq y \leq 75$, $0 \leq z \leq 40$, $0 \leq u \leq 30$, $0 \leq v \leq 30$ and $x+y+z+u+v=100$, represented by mol %, is incorporated in a phosphor layer on the inner surface of a glass tube.

4. The fluorescent lamp as claimed in claim 3, wherein x, y, z, u and v satisfy the relationships of $10 \leq x \leq 65$, $30 \leq y \leq 65$, $0 \leq z \leq 35$, $0 \leq u \leq 25$ and $0 \leq v \leq 20$, represented by mol %.

5. The fluorescent lamp as claimed in claim 1 or 3, wherein the glass composition has a softening point in a temperature range of 600° to 700° C.

6. The fluorescent lamp as claimed in claim 1 or 3, wherein the glass composition has a water solubility of at most 200 µS/cm represented by electric conductivity.

7. The fluorescent lamp as claimed in claim 1 or 3, wherein the glass composition is incorporated in the phosphor layer on the inner surface of the glass tube in a proportion of 0.1 to 10 weight % based on the phosphor.

* * * * *